United States Patent
Moneyron et al.

(10) Patent No.: US 10,994,702 B2
(45) Date of Patent: May 4, 2021

(54) ADAPTER FOR A WIPER BLADE OF A MOTOR VEHICLE AND ASSEMBLY COMPRISING SUCH AN ADAPTER

(71) Applicant: Valeo Systèmes d'Essuyage, Le Mesnil Saint Denis (FR)

(72) Inventors: Patrick Moneyron, Issoire (FR); Philippe Espinasse, Issoire (FR); William Terrasse, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 274 days.

(21) Appl. No.: 16/043,661

(22) Filed: Jul. 24, 2018

(65) Prior Publication Data
US 2019/0031152 A1    Jan. 31, 2019

(30) Foreign Application Priority Data

Jul. 31, 2017    (FR) .................................. 1757281

(51) Int. Cl.
*B60S 1/40*    (2006.01)
*B60S 1/38*    (2006.01)

(52) U.S. Cl.
CPC .............. *B60S 1/40* (2013.01); *B60S 1/4048* (2013.01); *B60S 1/387* (2013.01); *B60S 2001/4051* (2013.01)

(58) Field of Classification Search
CPC ........ B60S 1/40; B60S 1/4038; B60S 1/4045; B60S 1/4048; B60S 1/4003; B60S 2001/4051; B60S 2001/4054; B60S 1/387
USPC .................................................... 15/250.32
See application file for complete search history.

(56) References Cited

U.S. PATENT DOCUMENTS

| 7,690,074 B2 | 4/2010 | Ostrowski |
| 8,713,747 B2* | 5/2014 | Coughlin .............. B60S 1/3801 |
| | | 15/250.32 |
| 2013/0139343 A1* | 6/2013 | Kim ..................... B60S 1/4006 |
| | | 15/250.32 |

(Continued)

FOREIGN PATENT DOCUMENTS

| DE | 10257988 A1 | 2/2004 |
| DE | 10 2011 053088 A1 | 2/2013 |

(Continued)

OTHER PUBLICATIONS

Preliminary Search Report and Written Opinion issued in corresponding French Application No. 1757281, dated Apr. 5, 2018 (6 pages).

*Primary Examiner* — Gary K. Graham
(74) *Attorney, Agent, or Firm* — Osha Bergman Watanabe & Burton LLP

(57) ABSTRACT

The invention proposes an adapter (26) which is delimited by two external lateral faces and which is shaped so as to be mounted in a cap (28) of reverse U-shaped section, comprising a pair of front locking lugs (44a, 44b) which cooperate with the associated notches (59a, 59b) of the adapter (26) in order to fix the cap (28) to the adapter (26) in a dismantlable manner, each of the lateral faces (29a, 29b) of the body (25) of the adapter (26) comprising a front locking notch (59a, 59b), each thereof being capable of receiving an associated front locking lug (44a, 44b) of the cap (28), and the body (25) of the adapter (26) comprising rear locking notches which are arranged at one end of a resilient branch (62a, 62b) of the adapter.

13 Claims, 7 Drawing Sheets

(56) References Cited

U.S. PATENT DOCUMENTS

2016/0207501 A1\* 7/2016 Avasiloaie ............ B60S 1/4048

FOREIGN PATENT DOCUMENTS

| EP | 1403156 A1 | | 3/2004 |
|----|------------|---|--------|
| WO | 2015/160189 | \* | 10/2015 |
| WO | 2017/080783 | \* | 5/2017 |

\* cited by examiner

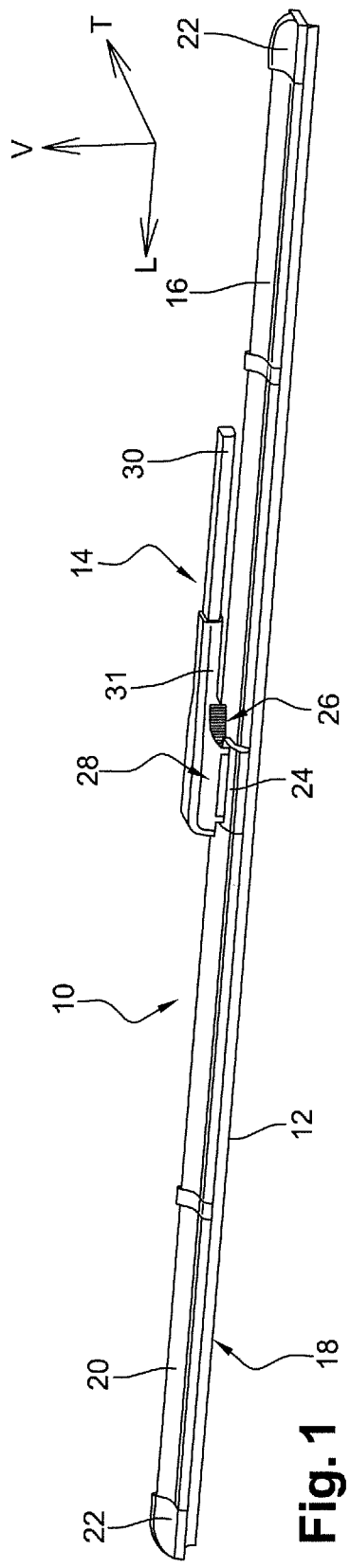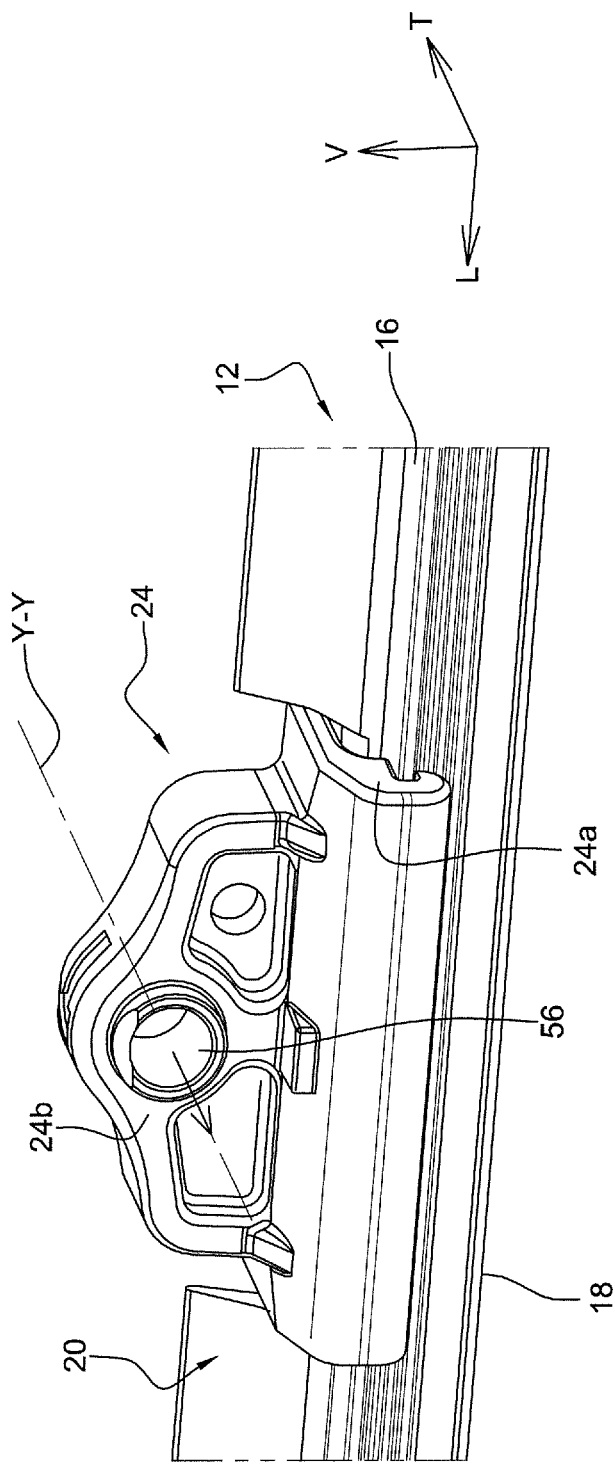
Fig. 1
Fig. 2

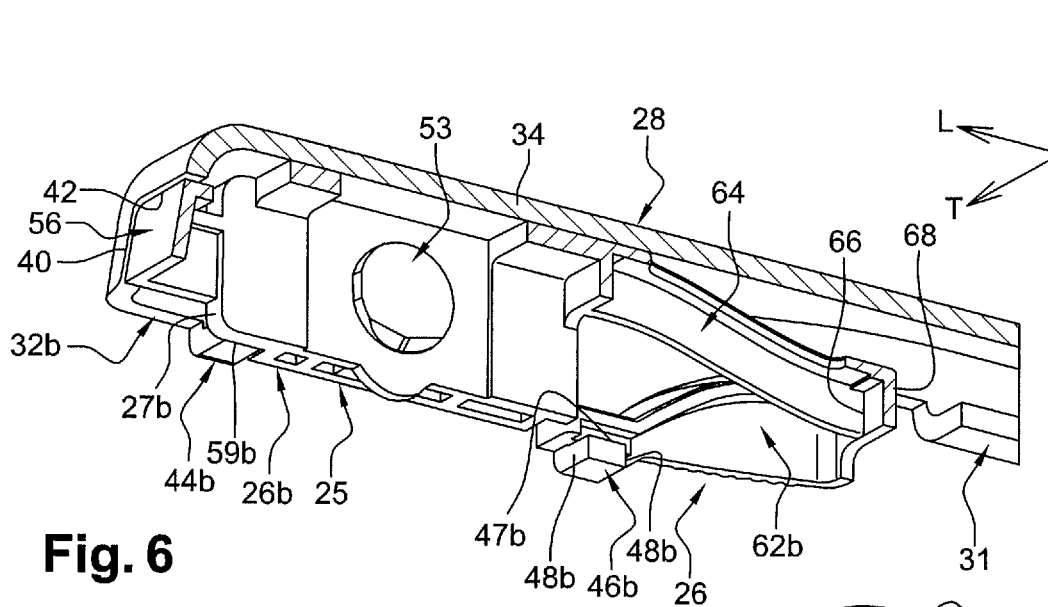
Fig. 6
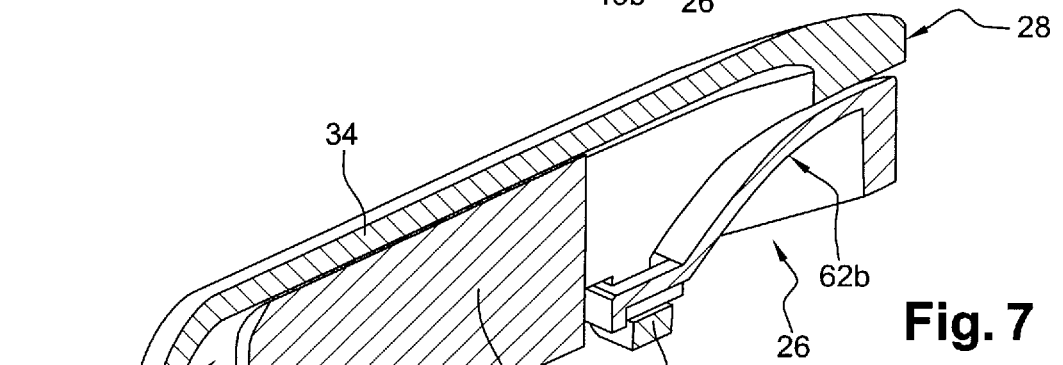
Fig. 7
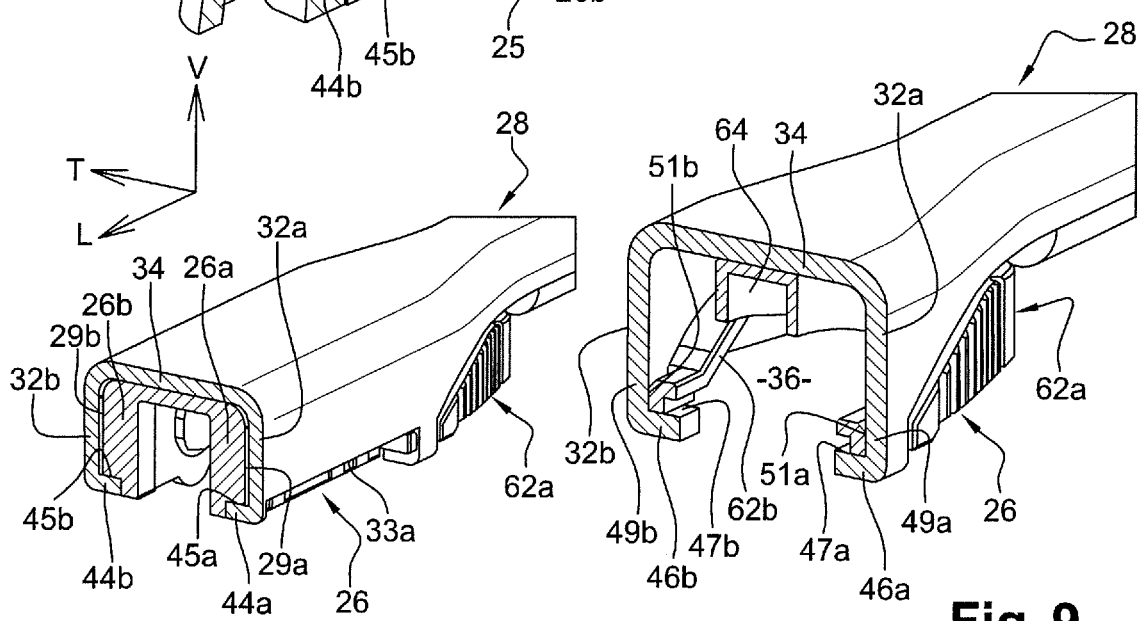
Fig. 8
Fig. 9

ADAPTER FOR A WIPER BLADE OF A MOTOR VEHICLE AND ASSEMBLY COMPRISING SUCH AN ADAPTER

TECHNICAL FIELD OF THE INVENTION

The invention relates, in particular, to an adapter for a windscreen wiper system, in particular of a motor vehicle.

The invention further relates to an assembly comprising a windscreen wiper arm and an adapter according to the invention.

The invention further relates to an assembly comprising a windscreen wiper and a connection system designed to connect the windscreen wiper to a drive arm, said connection system comprising a connector which is fixed to the windscreen wiper and an adapter according to the invention.

TECHNICAL BACKGROUND TO THE INVENTION

A motor vehicle is generally provided with windscreen wiper systems, in particular to provide cleaning of the external surface of the windscreen and thus to prevent the driver's view of the surroundings from being interrupted.

A windscreen wiper system generally comprises a drive arm, performing a reciprocal movement, in particular an angular movement, and a longitudinally elongated windscreen wiper which bears a wiper blade or scraper blade produced from an elastic material such as rubber or an elastomer material.

The wiper blade scrapes against the external surface of the windscreen and removes the water by driving it away from the field of vision of the driver.

In a conventional version, the windscreen wiper is produced in the form of articulated clips which retain the wiper blade in a plurality of discrete positions distributed longitudinally, providing it with a flexion which permits it to follow the curvature or curve of the windscreen.

In a more recent version denoted "flat blade", the windscreen wiper is produced in the form of a semi-rigid assembly which retains the wiper blade over its entire length due to one or more flexible members which permit the wiper and the wiper blade to be applied onto the windscreen without having to use clips.

In the two designs, the windscreen wiper is connected to the drive arm by a connection system comprising a complementary connector and adapter.

The connector is a part which is fixed to the windscreen wiper whilst the adapter is fixed to the drive arm.

The adapter is an intermediate part which permits the connection and the fixing of the connector to the drive arm. The adapter is generally shaped so as to be engaged in a head or terminal part of the drive arm, in the form of a cap and having a reverse U-shaped cross section.

Each of these two components (connector and adapter) comprises articulation means which are designed to cooperate with complementary means of the other component in order to define at least one transverse axis of articulation of the two components relative to one another, which is also the axis of articulation of the windscreen wiper relative to the drive arm.

According to a known technique, one of the components, such as the connector, generally comprises a substantially cylindrical physical axle which defines the axis of articulation and which is received in a housing of complementary shape to the other component.

The adapter generally comprises an elongated body which is shaped so as to be engaged in the front free terminal end part of the drive arm so that this body extends at least partially between two substantially parallel lateral walls of this terminal part.

An adapter permits a windscreen wiper to be connected to a particular type of terminal part. In the case of the aforementioned terminal parts of reverse U-shaped section, there are several variants with different designs of means for locking the cap onto the adapter.

A windscreen wiper arm is known where the terminal part thereof is a cap of reverse U-shaped section which comprises a pair of front locking lugs which are capable of cooperating with associated notches of the adapter to fix and lock the cap to the adapter in a dismountable manner, said adapter comprising rear locking means which are capable of cooperating with associated means of the cap, such as for example a pair of rear locking lugs.

An example of a design of adapter suitable for this type of cap is illustrated, for example, in the document U.S. Pat. No. 7,690,074.

The invention proposes an improved adapter of this type which is simple, efficient and economical and particularly easy to mount and to lock in the cap, whilst ensuring a reliable connection between these two components after mounting.

BRIEF SUMMARY OF THE INVENTION

The invention proposes an adapter for a windscreen wiper system, in particular of a motor vehicle, comprising a body of longitudinally elongated shape which is delimited by two longitudinal and vertical external lateral faces and which is shaped so as to be mounted in a complementary cap of reverse U-shaped section belonging to a windscreen wiper arm, this cap comprising a pair of front locking lugs which are capable of cooperating with the associated parts of the adapter in order to fix the cap to the adapter in a dismountable manner, each of the external lateral faces of the body of the adapter comprising a front locking notch, each thereof being capable of receiving an associated front locking lug of the cap, and the body of the adapter comprising rear locking means capable of cooperating with associated means of the cap, characterized in that said rear locking means of the adapter comprise at least one rear locking notch which is arranged at one end of a resilient branch of the adapter.

According to further features of the adapter:
the resilient branch extends longitudinally;
the rear locking notch is arranged in the vicinity of a rear transverse face of the body;
the resilient branch extends longitudinally from the rear to the front and the rear locking notch is arranged at the front longitudinal end of the resilient branch;
the resilient branch is designed to be deformed resiliently in a horizontal plane at right angles to the lateral faces;
the resilient branch is capable of pivoting about a vertical geometric axis arranged in the vicinity of the rear longitudinal end of the resilient branch;
the resilient branch extends longitudinally from the rear to the front and the rear longitudinal end of the resilient branch is connected to a connecting bar which extends longitudinally from a rear transverse face of the body of the adapter;
the rear locking notch comprises an abutment surface of transverse orientation which is capable of cooperating with a surface opposite the cap in order to immobilize the adapter relative to the cap longitudinally in one direction;

the abutment surface extends in a vertical plane;

the resilient branch comprises an unlocking control surface;

the adapter has an overall symmetry of design relative to a median longitudinal and vertical plane;

the body of the adapter comprises a front finger borne by a front transverse face of the body of the adapter.

The invention further proposes an assembly comprising a windscreen wiper arm and an adapter according to the invention, characterized in that the cap of the windscreen wiper arm comprises a pair of front locking lugs and a pair of rear locking lugs and in that at least one rear locking lug is capable of cooperating with said at least one rear locking notch of the adapter in order to fix the cap to the adapter in a dismountable manner.

The cap comprises a transverse wall having a front end of vertical orientation which comprises a recess and the body of the adapter comprises a front finger which, in the mounted and locked position of the cap on the adapter, extends longitudinally to the front through the recess.

The invention further proposes an assembly comprising a windscreen wiper and a connection system designed to connect the windscreen wiper to a drive arm, said connection system comprising a connector fixed to the windscreen wiper and an adapter according to the invention, the connector and the adapter being connected to one another by articulation means.

BRIEF DESCRIPTION OF THE DRAWINGS

Further features and advantages of the invention will become apparent whilst reading the following detailed description, for the understanding thereof reference will be made to the accompanying drawings, in which:

FIG. 1 is a schematic view in perspective of a windscreen wiper system comprising a windscreen wiper and a drive arm connected together by a connection system comprising a connector and an adapter, the drive arm comprising a rod and an end cap;

FIG. 2 is a view in large scale and in perspective which illustrates the connector fixed directly to the windscreen wiper;

FIG. 6 is a view in section through a median longitudinal and vertical plane of the assembly illustrated in FIG. 5;

FIG. 7 is a sectional view similar to that of FIG. 6 according to a further longitudinal and vertical plane passing through the front and rear locking lugs of the end cap;

FIG. 8 is a view of the assembly illustrated in FIG. 5 in section through a transverse and vertical plane passing through the front locking lugs of the end cap;

FIG. 9 is a view of the assembly illustrated in FIG. 5 in section through a transverse and vertical plane passing through the rear locking lugs of the end cap;

DETAILED DESCRIPTION OF THE FIGURES

Figure 3:
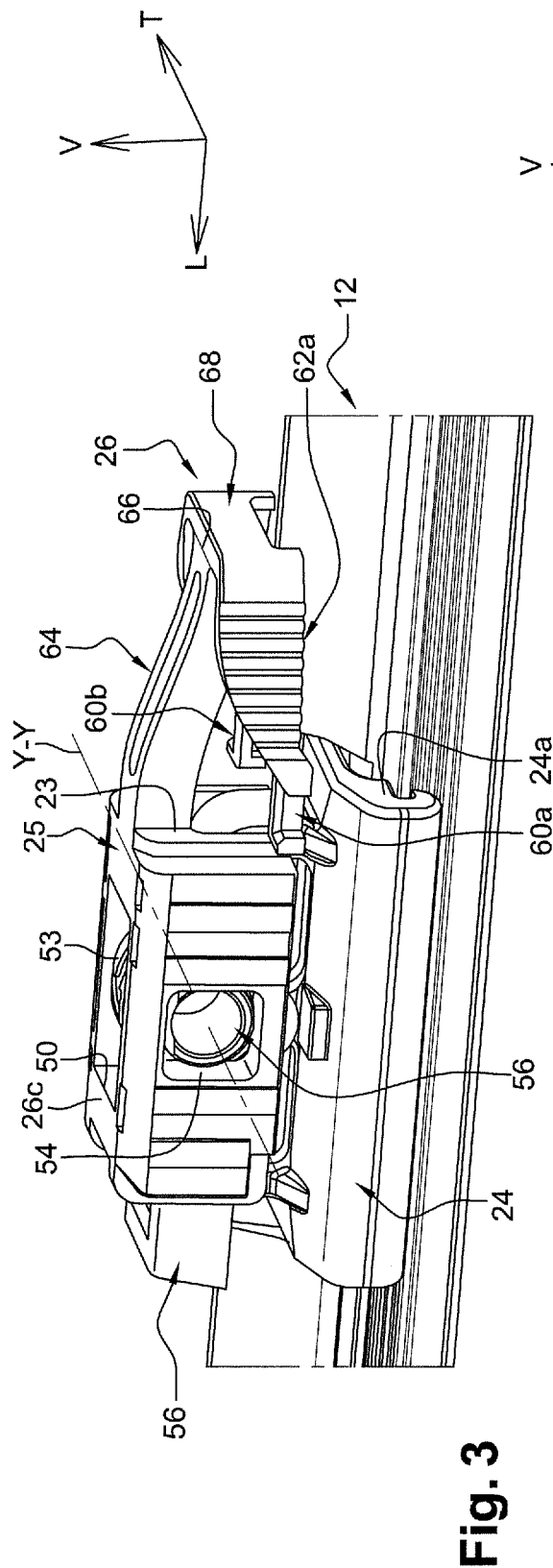
FIG. 3 is a view similar to that of FIG. 2 which illustrates the adapter in the mounted position on the connector.

In the remainder of the description, elements having an identical structure or similar functions will be denoted by the same reference numerals.

In the remainder of the description, in a non-limiting manner the orientations longitudinal, vertical and transverse indicated by the trihedron L, V, T in the figures will be adopted. A horizontal plane which extends longitudinally and transversely is also defined. Thus, in the description the terms "longitudinal", "vertical" or "transverse" refer to the orientation of the windscreen wiper or the drive arm.

The longitudinal direction corresponds to the principal axis of the windscreen wiper or the drive arm in which it extends from the rear to the front along the orientation of the axis L of the trihedron L, V, T.

The lateral orientations respectively correspond to intersecting straight lines, i.e. which intersect the longitudinal direction, in particular by being perpendicular to the longitudinal axis of the windscreen wiper or the drive arm.

The terms "rear" or "front" are to be interpreted relative to the point of fixing the wiper on the arm, the term "rear" corresponding to the part where the arm and a half-wiper extend or relative to the point of fixing the arm to the vehicle.

The terms "internal", "external", "interior" or "exterior" may refer to a part in its entirety, and relate, for example, to the interior or the exterior of this part.

A windscreen wiper system 10 comprising, in particular, a windscreen wiper 12 and a drive arm 14 (also called the windscreen wiper arm) of the windscreen wiper 12 has been shown in FIG. 1.

The wiper 12 in this case is of the "flat blade" type and comprises a longitudinal body 16, a wiper blade 18, generally made of rubber or elastomeric material, and at least one member (not shown) which stiffens the blade and promotes its application onto the external surface of a window of the vehicle, such as for example a curved windscreen (not shown) of the vehicle.

The longitudinal body 16 of the windscreen wiper 12 comprises an upper aerodynamic deflector 20 designed to improve the operation of the wiper system, this deflector having the function of improving the application of the windscreen wiper 12 onto the windscreen and thus improving the aerodynamic performance of the windscreen wiper system 10.

The windscreen wiper 12 further comprises terminal end fittings 22 or hooking clips for the blade 18 and for the member on the longitudinal body 16, these end fittings 22 being located at each of the two opposing front and rear longitudinal ends of the longitudinal body 16.

The drive arm 14 is designed to be driven by a motor to follow a reciprocal movement and, for example, an alternate angular movement, permitting the wiper blade 18 to remove water and potentially further undesirable elements covering the external surface of the windscreen.

Substantially at mid-length, the windscreen wiper 12 comprises a connection assembly comprising an intermediate connector 24 and an adapter 26.

The adapter 26 in this case is a part produced by moulding in a single piece and it has a symmetry of design relative to a median longitudinal and vertical plane. Preferably, the adapter according to the invention is produced from plastics material.

The adapter 26 which is fixed to the arm 14 is mounted on the connector 24 so as to permit a degree of freedom in rotation about a transverse axis of articulation Y-Y which is substantially perpendicular to the longitudinal axis of the windscreen wiper 12.

This degree of freedom permits a rotation in the two directions of the windscreen wiper 12 relative to the drive arm 14 and thus permits the windscreen wiper 12, during its displacements, to follow the curvature or curve of the windscreen.

The adapter 26 provides the connection of the windscreen wiper 12 to the drive arm 14 and, in particular, to a head or front longitudinal terminal end piece of the drive arm 14 which may be formed in a single part with the drive arm, or alternatively connected and fixed thereto.

In the figures, the terminal part of the drive arm is a free front end section in the form of a cap 28 with a substantially reverse U-shaped cross section.

By way of non-limiting example, the cap 28 has an elongated shape which extends along a longitudinal axis which is generally substantially parallel to the general longitudinal axis of the windscreen wiper 12.

The cap 28 comprises a rear part 31 for connecting to the remainder of the drive arm 14 which in this case comprises an arm rod 30, the cap 28 being fixed thereto, for example, by crimping.

In section through a vertical and transverse plane, the cap 28 has a substantially reverse U-shape section.

Figure 5:
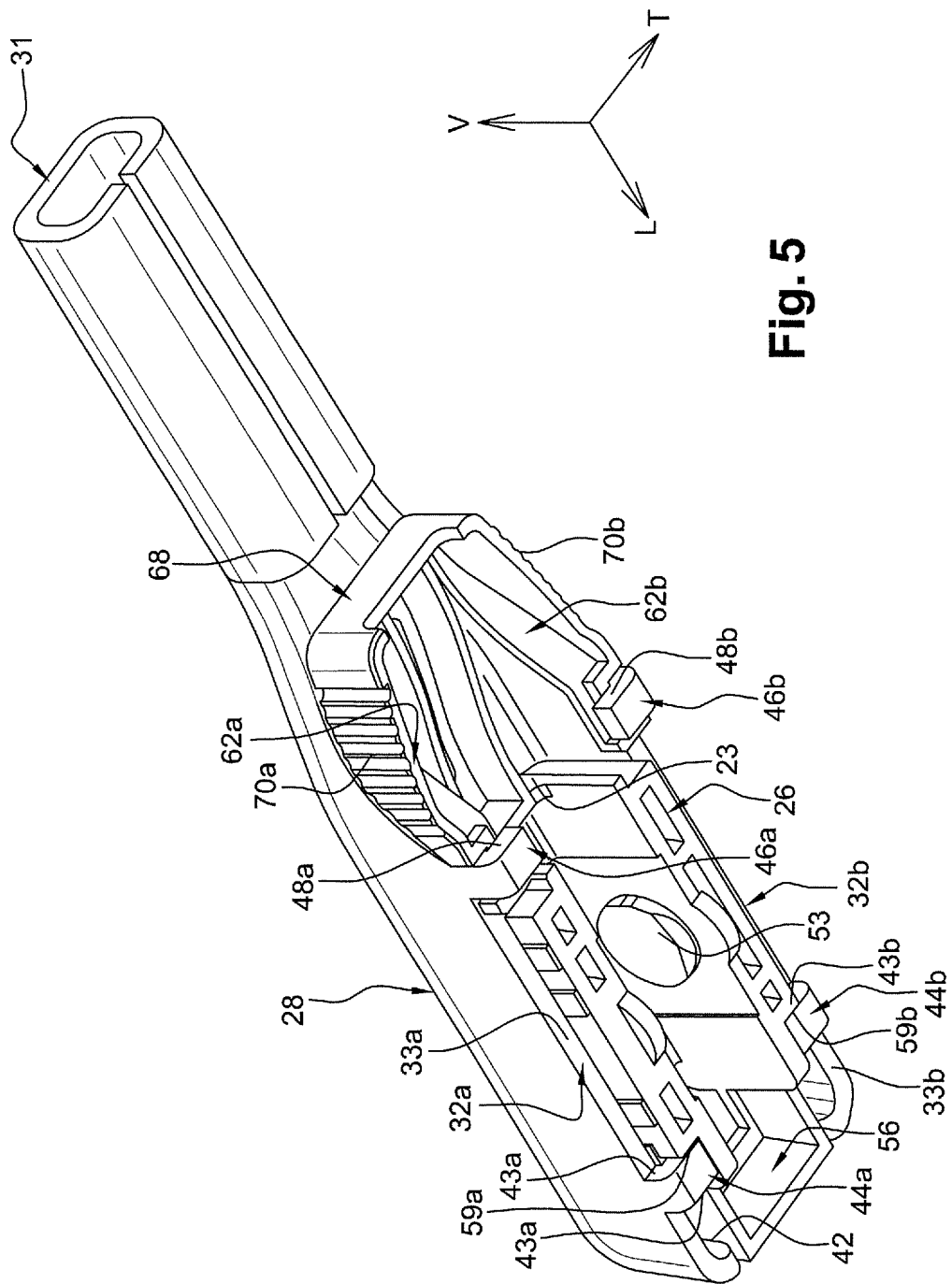
FIG. 5 is a view in perspective from below which illustrates in large scale the end cap in the mounted and locked position on the adapter according to the invention.
Figure 10:
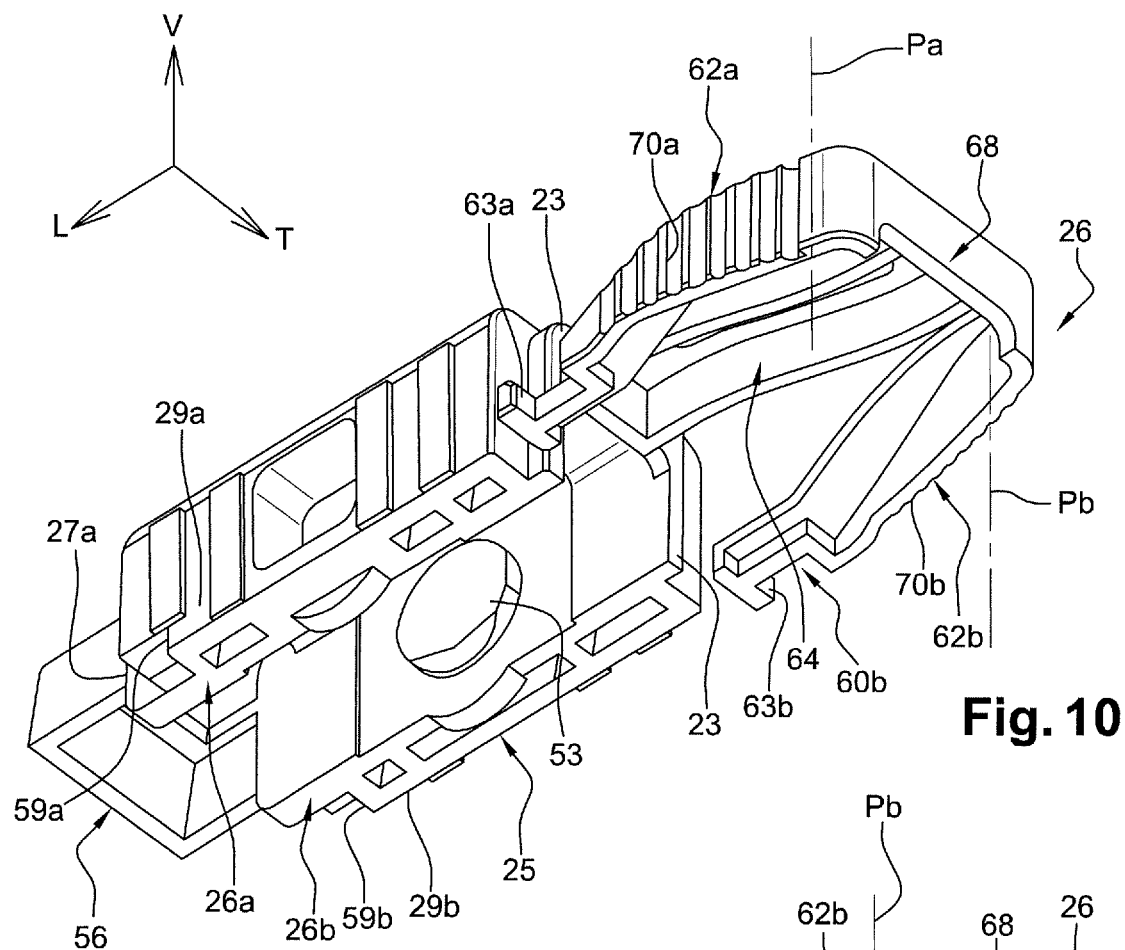
FIGS. 10 and 11 are two views in large scale of the adapter according to the invention which is illustrated in perspective according to two different viewing angles.
Figure 11:
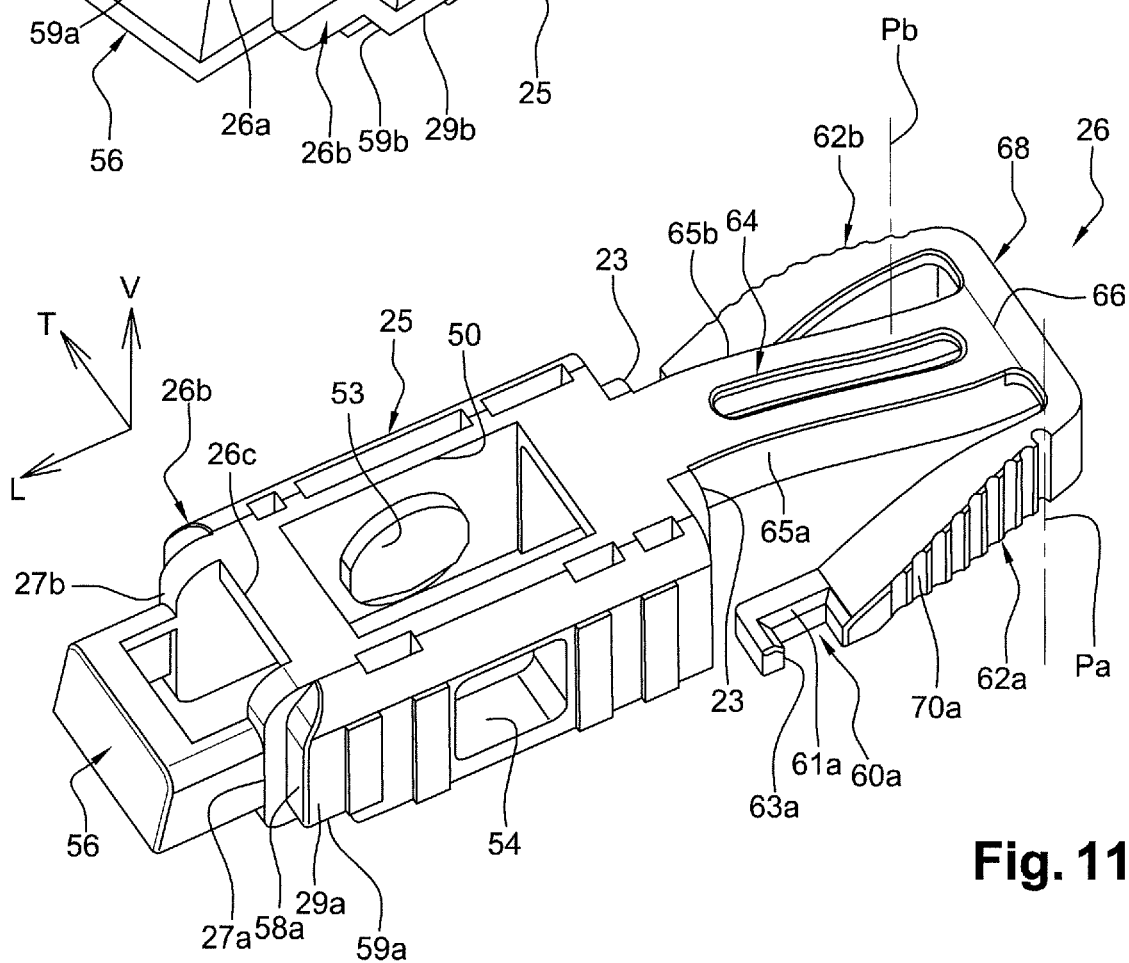
Figure 13:
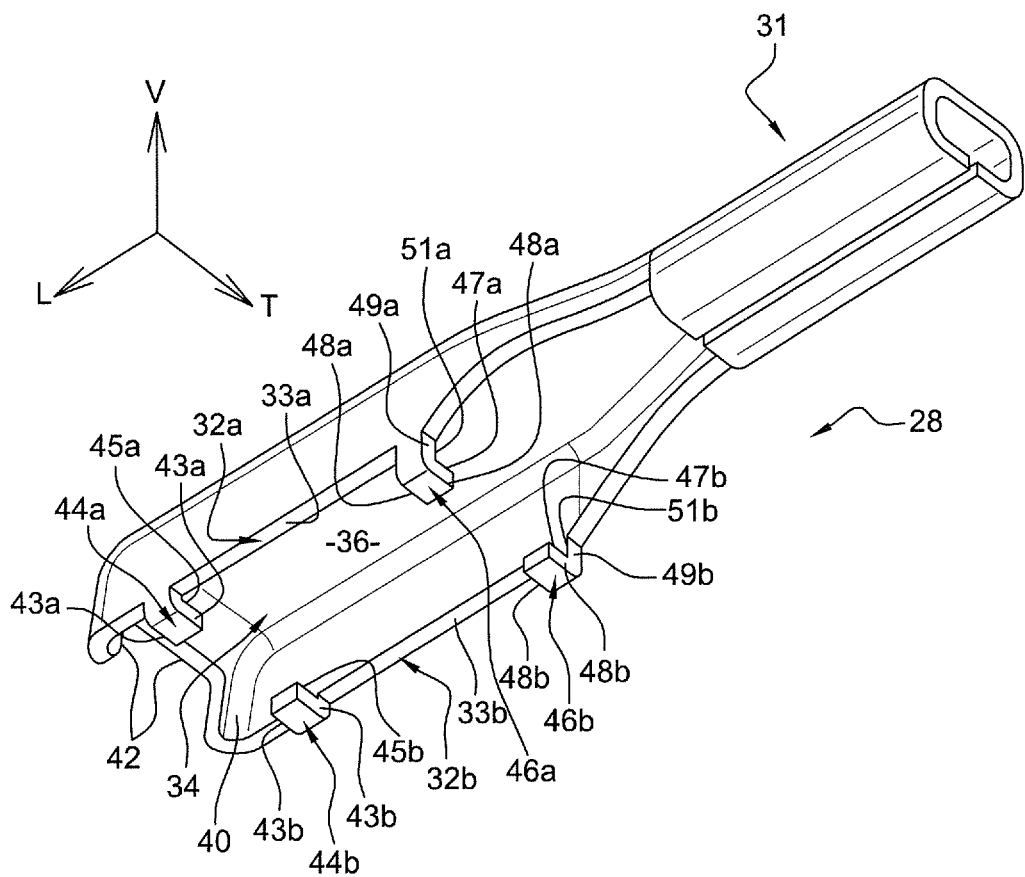
FIG. 13 is a view from below in large scale and in perspective of the end cap of the windscreen wiper arm.

As illustrated in detail in FIGS. 5, 6 and 13, the cap 28 comprises two lateral vertical walls of longitudinal orientation 32a, 32b, the upper longitudinal edges thereof being connected together by an upper transverse wall of longitudinal orientation 34. The walls 32a, 32b and 34 delimit relative to one another an internal space 36 for housing the adapter 26.

At their front end, the lateral walls 32a, 32b are connected together by a front vertical transverse wall 40 which comprises a central recess 42 of rectangular contour which opens out vertically toward the bottom into the lower transverse edge of the front wall 40.

The lateral walls 32a, 32b are delimited vertically toward the bottom by the lower longitudinal edges 33a, 33b.

Each lower longitudinal edge 33a, 33b comprises a front locking lug 44a, 44b in the vicinity of its front end and a rear locking lug 46a, 46b in the vicinity of its rear end.

The front lugs form a pair of front locking lugs 44a, 44b which are aligned longitudinally and the rear lugs form a pair of rear locking lugs 46a, 46b which are aligned longitudinally.

Each front locking lug 44a, 44b is in the form of a horizontal locking tab which extends transversely to the interior and which is respectively delimited by an upper horizontal face 45a, 45b.

Each horizontal locking tab 44a, 44b is also delimited by a pair of transverse and vertical faces 43a, 43b.

Each rear locking lug 46a, 46b comprises a horizontal locking tab which extends transversely to the interior and which is respectively delimited by an upper horizontal face 47a, 47b. Each horizontal locking tab 46a, 46b is also delimited by a pair of transverse and vertical faces 48a, 48b.

Each rear horizontal locking tab 46a, 46b is connected to the associated lower longitudinal edge 33a, 33b by a vertical locking tab 49a, 49b.

Each vertical locking tab 49a, 49b is delimited laterally by an external longitudinal and vertical face 51a, 51b.

The adapter 26 comprises a principal elongated body 25 which is shaped so as to be mounted in the internal space 36 of the cap 28.

In section through a transverse vertical plane, the adapter has a substantially reverse U-shape. It comprises two lateral vertical and longitudinal walls 26a, 26b which are delimited longitudinally toward the front by a vertical edge 27a, 27b, respectively having a front longitudinal end.

The two lateral walls 26a, 26b are connected together by an upper horizontal wall 26c which in this case comprises a central recess 50 of elongated rectangular contour.

Each lateral wall 26a, 26b is delimited by an external lateral face 29a, 29b of longitudinal and vertical orientation.

The body 25 of the adapter 26 is also delimited longitudinally to the rear by a rear transverse and vertical face 23 which is recessed centrally and which has a general shape of a reverse U-shape.

The lateral walls 26a, 26b respectively comprise an orifice 54 and a trunnion 53 aligned transversely. These elements 53 and 54 are located longitudinally, substantially in the middle of the lateral walls 26a, 26b of the adapter 26.

The elements 53 and 54 define the substantially transverse axis of articulation Y-Y in rotation of the connector 24 relative to the adapter 26 and thus of the windscreen wiper 12 relative to the drive arm 14.

The connector 24 essentially comprises a lower part 24a for crimping or fixing to the windscreen wiper 12 and an upper part 24b designed to be housed between the internal faces of the lateral walls 26a, 26b of the adapter 26.

The upper part 24b comprises complementary means 56 of the elements 53 and 54 designed to be aligned with the axis Y-Y.

As a variant, not shown, one of the components from the adapter 26 and the connector 24 may comprise cylindrical trunnions centred on the axis Y-Y and designed to be engaged by elastic clipping in an orifice or orifices complementary to the other of these components.

At its front longitudinal end the body 25 of the adapter 26 comprises in this case a finger 56 having a front end which extends longitudinally to the front in the extension of the body 25 of the adapter 26. The finger 56 is thus preferably borne by each vertical edge 27a, 27b having a front longitudinal end.

The dimensions and the contour of the front finger 56 are complementary to those of the recess 42 in which it is received when the cap 28 is in the mounted and locked position on the adapter 26. In the mounted position, the external surface of the front longitudinal wall of the finger 56 is in contact with the external surface of the front vertical transverse wall 40.

In order to receive an associated front locking lug 44a, 44b—in the vicinity of its front end—each lateral wall 26a, 26b comprises a front L-shaped groove 58a, 58b which comprises a lower horizontal portion 59a, 59b which is open to the front.

Each front locking lug 44a, 44b may be introduced vertically from top to bottom into the associated groove 58a, 58b, then slid longitudinally to the rear into the lower portion 59a, 59b forming the front locking notch to produce a mounting and locking of the "bayonet" type.

This engaged position of the front locking lugs 44a, 44b in their locking notches 59a, 59b is illustrated in detail in FIGS. 5 to 8.

Now will be described the rear locking means of the adapter 26 which are capable of cooperating with the rear locking lugs 46a, 46b of the cap 28.

These rear locking means of the adapter 26 comprise at least one rear locking notch 60a, 60b which is arranged at one end of an associated resilient branch 62a, 62b of the adapter 26.

From its rear transverse face 23, the body 25 of the adapter 26 extends longitudinally to the rear through a central rigid and recessed bar 64. This recess opens into the upper face of the bar 64. Thus the bar 64 comprises two branches 65a, 65b extending in parallel.

At its rear longitudinal end 66, the central bar 64 is connected to a rear crossmember 68 comprising two transversely opposed portions.

From each of these portions the resilient branch 62a, 62b extends longitudinally from the rear to the front, the rear longitudinal end thereof thus being connected to the central bar 64.

The front free end of the resilient branch 62a, 62b bears the rear locking notch 60a, 60b.

Figure 12:
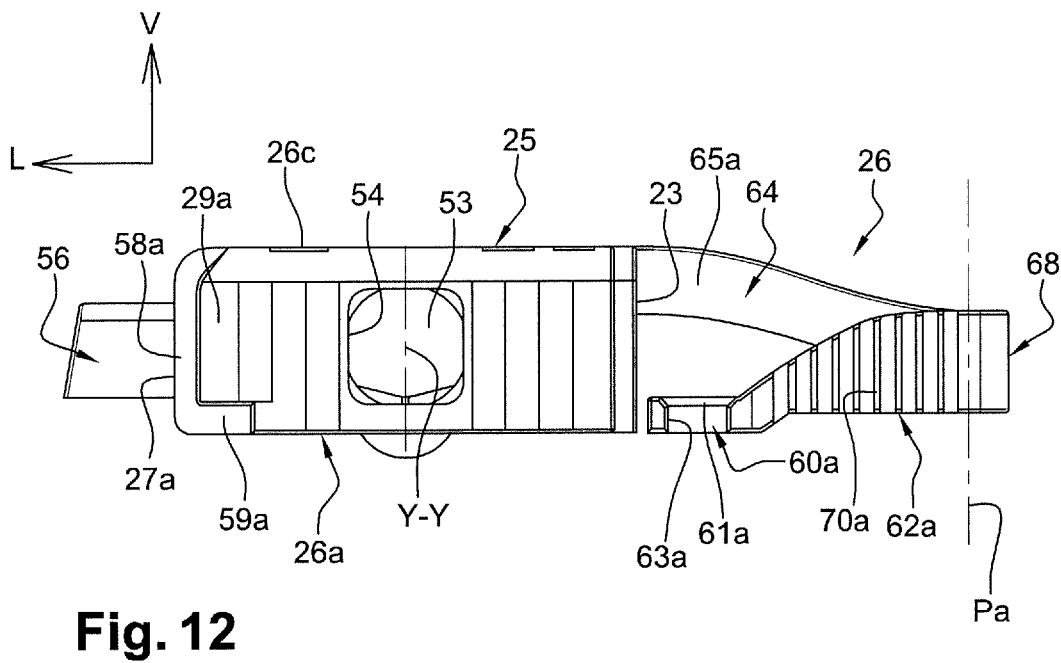
FIG. 12 is a lateral view in large scale of the adapter according to the invention.

Thus as may be seen, in particular, in FIG. 12, each rear locking notch 60a, 60b is arranged in the vicinity of the rear transverse face 23 of the body 25 of the adapter 26.

Each rear locking notch 60a, 60b is shaped in a horizontally inclined C-shape, which is open transversely to the outside, and each notch is delimited by three consecutive vertical faces. In other words, viewed from above, i.e. viewed from the cap 28 of the drive arm 14 when the adapter 26 is arranged in this cap 28, each rear locking notch 60a, 60b is shaped in a "U-shape".

The internal dimensions of each rear locking notch 60a, 60b are substantially equal and complementary to those of the vertical locking tabs 49a, 49b such that in the mounted and locked position of the cap 28 on the adapter 26, a vertical locking tab 49a, 49b is received in an associated rear locking notch 60a, 60b as may be seen, in particular, in FIG. 5.

The upper edge 61a, 61b of each rear locking notch 60a, 60b has a chamfered profile.

In a manner so as to permit the engagement and then the interlocking of the vertical locking tab 49a, 49b in its associated rear locking notch 60a, 60b, each resilient branch 62a, 62b is designed to be elastically deformed in a horizontal plane at right angles to the external lateral faces 29a, 29b of the body 25 of the adapter 26.

To this end, in the vicinity of its rear longitudinal end, each resilient branch 62a, 62b is capable of being deformed resiliently and being pivoted about a vertical geometric axis "Pa, Pb".

To cause such a resilient deformation, each resilient branch 62a, 62b comprises an external grooved unlocking control surface 70a, 70b.

By acting simultaneously on the two grooved control surfaces 70a and 70b a user may cause the two locking branches 62a and 62b, and thus the two rear locking notches 60a, 60b, to move together transversely toward the interior and toward one another to permit the rear locking lugs 46a and 46b to be disengaged.

In the mounted and locked position of the cap 28 on the adapter 26, when a vertical locking tab 49a, 49b is received in an associated rear locking notch 60a, 60b, the cap 28 is also immobilized longitudinally to the front relative to the adapter 26 to avoid any accidental disengagement, in particular if the front locking lug 44a, 44b should leave its associated front locking notch.

It is the vertical and transverse face 63a, 63b of the rear locking notch 60a, 60b which constitutes a longitudinal abutment surface which cooperates with a portion of the surface opposite the rear vertical tab 49a, 49b.

Figure 4:
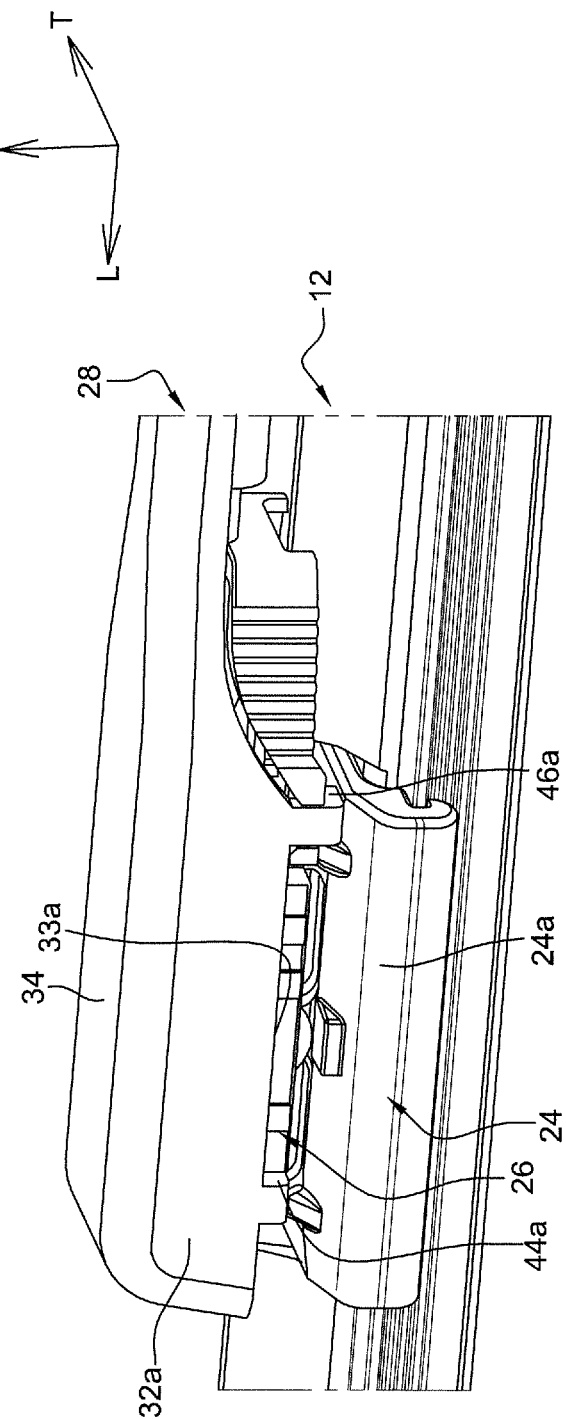
FIG. 4 is a view similar to that of FIG. 3 which illustrates the end cap in the mounted and locked position on the adapter according to the invention.

To mount and lock the adapter 26 in the cap 28, firstly the front locking lugs 44a and 44b are engaged in the front locking notches 59a and 59b and then the cap 28 is pivoted relative to the adapter about a horizontal axis passing substantially through the front locking lugs 44a and 44b—in a clockwise direction when viewing FIG. 4.

This pivoting causes the rear horizontal tabs 48a and 48b to come into contact with the chamfered edges 61a, 61b of the rear locking notches 60a, 60b. This produces, therefore, a slight resilient deformation of the resilient branches 62a and 62b and an engagement by interlocking of each vertical locking tab 49a, 49b in the associated rear locking notch 60a, 60b.

Figure 14:
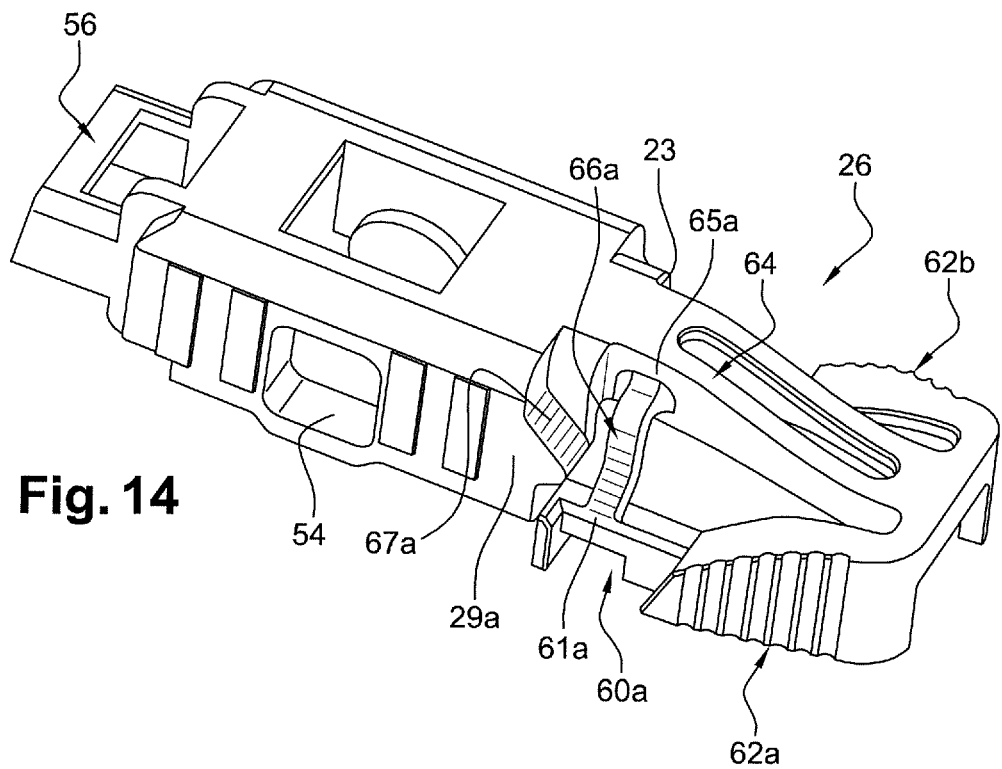
FIGS. 14 and 15 are views similar to those of FIGS. 11 and 12 which illustrate a variant of an adapter according to the invention.
Figure 15:
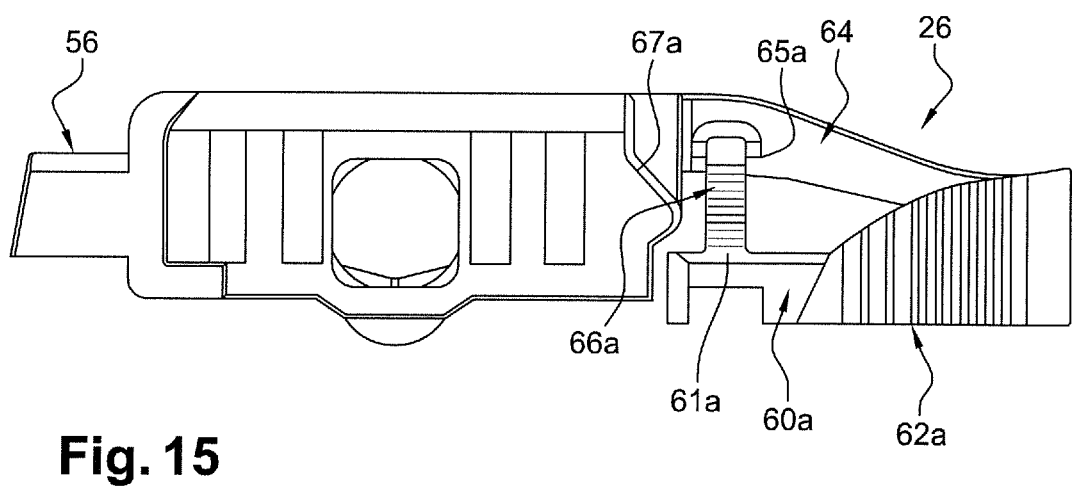

According to the variant shown in FIGS. 14 and 15, each chamfered longitudinal edge 61a, 61b is extended vertically to the top by a vertical guide ramp 66a, 66b which facilitates the action of the rear horizontal tabs 48a and 48b in order to bring together the resilient branches 62a and 62b transversely toward the interior and to facilitate the clipping of the vertical locking tabs 49a, 49b in the associated rear notches 60a, 60b.

Each vertical guide ramp 66a, 66b connects a longitudinal edge 61a, 61b to a vertically aligned portion of the lateral face of the bar 64, of vertical and longitudinal orientation.

Each vertical guide ramp 66a, 66b thus generally extends in a vertical plane with an inclined profile which converges from the bottom to the top in the direction of the bar 64.

In this variant, substantially in the region of the rear transverse face 23 and at mid-height of the body 25 of the adapter 26, in the extension of each external lateral face 29a, 29b, the body 25 comprises a longitudinal guide ramp 67a, 67b which extends longitudinally from the front to the rear by being inclined from top to bottom.

Each longitudinal guide ramp 67a, 67b at its free rear end passes vertically into a portion opposite the associated vertical guide ramp 66a, 66b.

Thus the rear horizontal tabs 48a, 48b firstly cooperate with the longitudinal guide ramps 67a, 67b and then with the vertical guide ramps 66a, 66b to facilitate the mounting and the locking of the adapter 26 in the cap 28.

The invention claimed is:

1. An adapter for a windscreen wiper system of a motor vehicle, the adapter being elongated to define a front and rear end, said adapter comprising:

a body of longitudinally elongated shape which is delimited by two longitudinal and vertical external lateral faces and which is shaped so as to be mounted in a complementary cap of reverse U-shaped section belonging to a windscreen wiper arm, this cap comprising a pair of front locking lugs which are capable of cooperating with associated parts of the adapter in order to fix the cap to the adapter in a dismantlable manner, each of the external lateral faces of the body of the adapter comprising a front locking notch, each thereof being capable of receiving an associated front locking lug of the cap, and the body of the adapter comprising rear locking means capable of cooperating with associated means of the cap, wherein said rear locking means of the adapter comprise at least one rear locking notch which is arranged at one end of a resilient branch of the adapter, and wherein the resilient branch extends longitudinally from the rear end towards the front end and in that a rear longitudinal end of the resilient branch is connected to a connecting bar which extends longitudinally from a rear transverse face of the body of the adapter.

2. The adapter according to claim 1, wherein the rear locking notch is arranged in the vicinity of a rear transverse face of the body of the adapter.

3. The adapter according to claim 1, wherein the rear locking notch is arranged at a front longitudinal end of the resilient branch.

4. The adapter according to claim 1, wherein the resilient branch is deformed resiliently in a horizontal plane at right angles to said lateral faces.

5. The adapter according to claim 4, wherein the resilient branch is capable of pivoting about a vertical geometric axis arranged in vicinity of a rear longitudinal end of the resilient branch.

6. The adapter according to claim 1, wherein the rear locking notch comprises an abutment surface of transverse orientation which is capable of cooperating with a surface opposite the cap to immobilize the adapter relative to the cap longitudinally in one direction.

7. The adapter according to claim 6, wherein the abutment surface extends in a vertical plane.

8. The adapter according to claim 1, wherein the resilient branch comprises an unlocking control surface.

9. The adapter according to claim 1, wherein the adapter has an overall symmetry of design relative to a median longitudinal and vertical plane.

10. The adapter according to claim 1, characterized in that the body of the adapter comprises a front finger borne by a front transverse face of the body of the adapter.

11. An assembly comprising:
a windscreen wiper arm; and
an adapter according to claim 1,
wherein a cap of the windscreen wiper arm comprises a pair of front locking lugs and a pair of rear locking lugs and at least one rear locking lug is capable of cooperating with said at least one rear locking notch of the adapter in order to lock the cap to the adapter in a dismantlable manner.

12. The assembly according to claim 11, wherein the cap comprises a transverse wall having a front end of vertical orientation which comprises a recess and the body of the adapter comprises a front finger which, in the mounted and fixed position of the cap on the adapter, extends longitudinally to the front through the recess.

13. An assembly comprising a windscreen wiper and a connection system to connect the windscreen wiper to a drive arm, said connection system comprising: a connector fixed to the windscreen wiper; and an adapter according to claim 1, the connector and the adapter being connected to one another by articulation means.

* * * * *